Sept. 7, 1943.  J. C. BOWMAN  2,329,032
GRASS SHEARS
Filed July 23, 1943
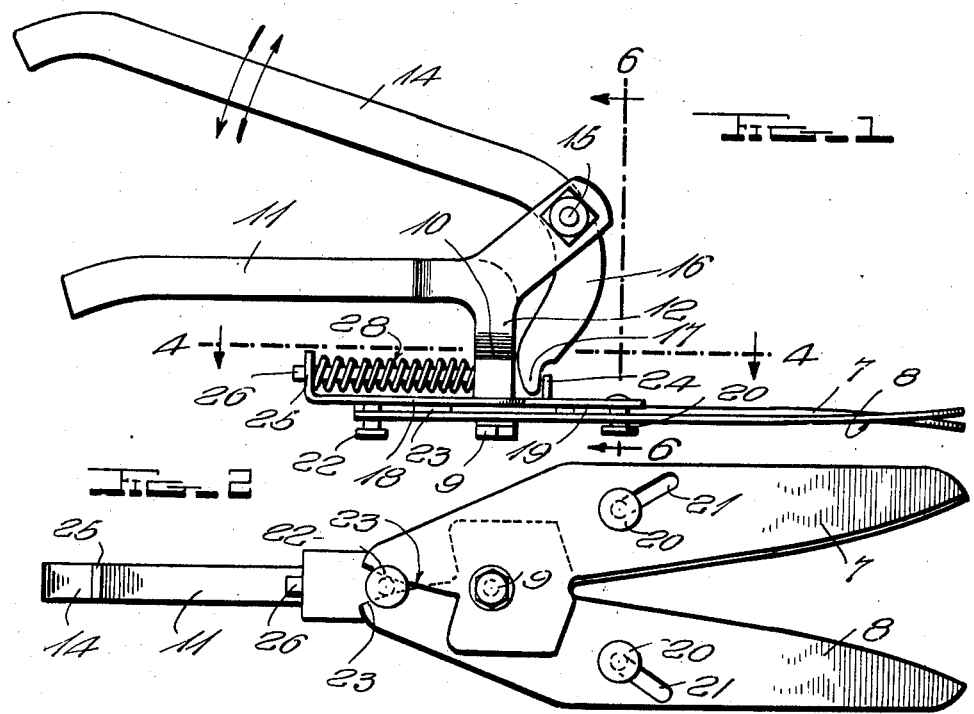
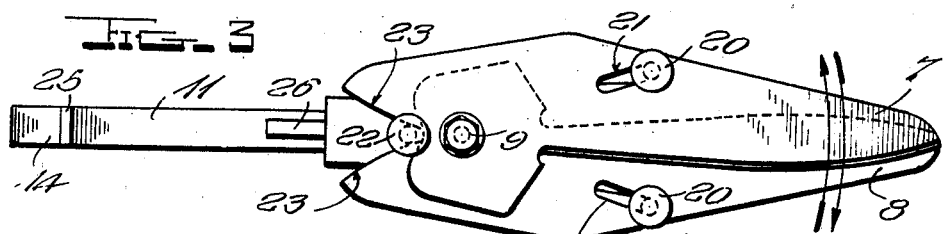
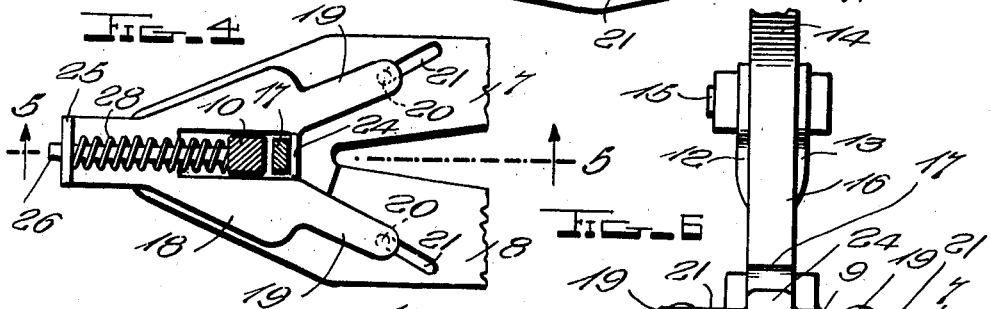
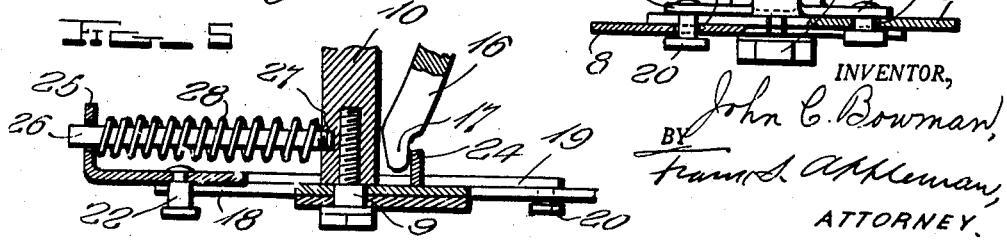
INVENTOR,
John C. Bowman
BY
Frank A. Appleman,
ATTORNEY.

Patented Sept. 7, 1943

2,329,032

UNITED STATES PATENT OFFICE 2,329,032

GRASS SHEARS

John C. Bowman, Winchester, Va.

Application July 23, 1943, Serial No. 495,878

4 Claims. (Cl. 30—248)

This invention relates to grass cutters of the shear type, and an object of the invention is to provide novel means for exerting force or pressure on the blades on opposite sides of the pivot on which the blades articulate so that the power occasioned by the manipulation of the handles of the shears is multiplied or increased.

A further object of the invention is to provide shear blades having camming surfaces or edges rearwardly of the pivot and camming slots in the blades themselves, the said slots being occupied by studs and the camming edges being engaged by a stud, which studs reciprocate in a straight line longitudinally of the shears.

It is a still further object of this invention to provide a reciprocating plate carrying the said studs and to provide novel means whereby the operation of a handle moves the said plate longitudinally of the shears; means being also provided for retracting the plate after it has been advanced or moved under the influence of the handle.

It is furthermore an object of the invention to provide shear mechanism which is strong and durable and comparatively inexpensive to produce and maintain.

With the foregoing and other objects in view, the invention consists in the details of construction, and in the arrangement and combination of parts to be hereinafter more fully set forth and claimed.

In describing the invention in detail, reference will be had to the accompanying drawing forming part of this application, wherein like characters denote corresponding parts in the several views, and in which:

Figure 1 illustrates a view in side elevation of grass shears embodying the invention;

Figure 2 illustrates a bottom plan view thereof with the mechanism in one position with the blades open;

Figure 3 illustrates a bottom plan view of the mechanism when the blades are closed;

Figure 4 illustrates a sectional view on the line 4—4 of Fig. 1;

Figure 5 illustrates a sectional view of the shears on the line 5—5 of Fig. 4; and Figure 6 illustrates a sectional view on the line 6—6 of Fig. 1.

In the drawing 7 and 8 indicates the coacting blades which are pivotally mounted on a stud 9 anchored in a post 10 which is integral with one of the handles 11. The post and handle are provided with cheek pieces 12 and 13 suitably spaced apart, and a lever 14 forming the other handle is mounted between the cheek pieces on a pivot 15. The lever 14 is in the nature of a bell crank lever and has a downwardly extending arm 16 with a lug 17 on its end. A plate 18 has a slot which forms a clearance for the reception of the lower end of the post 10, and the said plate has diverging arms such as 19, each of which carries a stud such as 20 that moves in one of the slots 21 in one of the blades.

The arms and studs are duplicated so that the studs travel in the slots of the two blades, and the relation of parts is such that when the plate is projected toward the point of the blades they exert force on the said blades to cause them to overlap at their edges to perform the cutting operation.

Rearwardly of the pivot 9 of the blades the plate is provided with a stud 22 which engages the two beveled surfaces 23, one of which is formed on each of the rearward extensions of the blades.

The plate 18 is also provided with a lug 24 which is integral with the plate and extends upwardly into engagement with the lug 17 of the arm 16 of the handle, so that when the handle 14 is pressed downwardly at its outer end, the plate is moved longitudinally of the shears and the blades are articulated.

The plate is also provided with a flange 25 at its rear end and a guide rod 26 extends through the said flange, and the guide rod is anchored in the post 10 as at 27. A spring 28 on the guide rod abuts the flange 25 and the post 10 and is intended to exert pressure on the plate to retract it after the said plate has been projected by the manipulation of the handle; hence, as the handles are pressed together the blades are caused to perform a cutting action and the blades are returned to their normal position through the action of the spring operating as described in connection with a description of the parts.

As a description of the several elements of the shears is accompanied by a description of the functions and cooperative relation of the parts, a résumé of the operation is believed unnecessary for an understanding of the invention by one skilled in the art.

I claim:

1. In a grass cutter, coacting blades, a member on which the blades are pivotally mounted, each of said blades having a diagonally disposed slot extending outwardly from a location beyond the pivot of the blades and each of said blades having a camming edge at its inner end, a plate slidable approximately parallel with the blades, studs on the said plate extending through the slots of the blades, and a stud engaging the beveled rear edges of the blades, a lever for moving the plate longitudinally of the blades, and a resilient member for moving the plate rearwardly against the action of the lever.

2. In a grass cutter, a handle having a post, coacting blades pivotally mounted on the post, said blades having diagonal slots extending toward the edges thereof opposite the cutting edges, the said blades having camming edges rearwardly of the mounting of the blades, a plate slidable with respect to the member on which the blades are mounted, said plate having a lug in front of the blade mounting, a lever oscillatable on the blade mounting for engaging the lug and for forcing the plate toward the outer ends of the blades whereby the blades are moved on their pivot, means for retracting the plate when the lever is released, studs on the plate operating in the slots of the blades, and a stud on the plate engaging the camming edges at the rear ends of the blades.

3. In a grass cutter, a handle having a post, coacting blades pivotally mounted on the post, said blades having diagonally disposed slots extending outwardly toward the rear edges of the blades, the said blades having camming edges rearwardly of the post, a plate slidable with respect to the post and parallel with the blades, the said plate having studs in its forward end operating in the slots of the blades and a stud on its rearward end engaging the camming edges of the blades, said plate having a flange at its rear end, a guiding rod supported by said flange and anchored in the post, a spring encircling the guiding rod having its ends abutting the post and flange whereby the plate is retracted to open the blades, a lug on the forward end of the plate, and a lever pivoted on the post and having an end engaging the lug whereby the movement of the lever is communicated to the plate for moving it toward the outer ends of the blades.

4. In a grass cutter, coacting blades, a member on which the blades are pivotally mounted, each of said blades having a diagonally disposed slot extending outwardly from a location beyond the pivot of the blades and each of said blades having a camming edge at its inner end rearwardly of the member on which the blades are pivoted, a plate slidable approximately parallel with the blades, projections on the said plate extending through the slots of the blades, a projection on the plate engaging the beveled rear edges of the blades, a lever for moving the plate longitudinally of the blades, and a resilient member for moving the plate against the action of the lever.

JOHN C. BOWMAN.